United States Patent
Singh et al.

(10) Patent No.: US 10,907,949 B2
(45) Date of Patent: Feb. 2, 2021

(54) COORDINATE MEASURING MACHINE PROBE IDENTIFICATION APPARATUS AND METHOD

(71) Applicant: Hexagon Metrology, Inc., North Kingstown, RI (US)

(72) Inventors: Gurpreet Singh, Providence, RI (US); Milan Kocic, Pawtucket, RI (US); Michael Mariani, North Kingstown, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 225 days.

(21) Appl. No.: 16/150,206

(22) Filed: Oct. 2, 2018

(65) Prior Publication Data
US 2019/0107379 A1 Apr. 11, 2019

Related U.S. Application Data

(60) Provisional application No. 62/566,644, filed on Oct. 2, 2017.

(51) Int. Cl.
*G01B 5/012* (2006.01)
*G01B 21/04* (2006.01)
(Continued)

(52) U.S. Cl.
CPC ............. *G01B 5/012* (2013.01); *G01B 7/012* (2013.01); *G01B 11/007* (2013.01); *G01B 21/047* (2013.01); *G01B 2210/60* (2013.01)

(58) Field of Classification Search
CPC ............................. G01B 5/012; G01B 2210/60
(Continued)

(56) References Cited

U.S. PATENT DOCUMENTS 3,176,847 A    4/1965  Sedgwick
4,805,314 A *  2/1989  Hayashi ................. G01B 7/008
                                                    33/1 M
(Continued)

FOREIGN PATENT DOCUMENTS

EP    2154472 A2 *  2/2010  ........... G01B 21/047

OTHER PUBLICATIONS

International Search Report and Written Opinion for International Patent Application No. PCT/US18/54023, dated Dec. 13, 2018 (13 pages).

*Primary Examiner* — Christopher W Fulton
(74) *Attorney, Agent, or Firm* — Nutter McClennen & Fish LLP

(57) ABSTRACT

A coordinate measuring machine system has a base configured to support a workpiece, a movable portion configured to move relative to the base, and a control system configured to control movement of the base and/or the movable portion. The system also has a set of probes that each are configured to be removably couplable with the movable measurement portion. Each probe is configured to be removably couplable with the movable measurement portion, and has a shaft with a distal end and a proximal end. The proximal end has a region for coupling with the movable measurement portion, while the distal end has a region configured to interact with the workpiece. Each of the probes also has visual identifying indicia on the shaft. The visual identifying indicia are encoded to identify at least one characteristic of the probe. Specifically, the indicia are encoded as Base 3 or Base 4 indicia.

29 Claims, 6 Drawing Sheets

(51) Int. Cl.
*G01B 7/012* (2006.01)
*G01B 11/00* (2006.01)

(58) Field of Classification Search
USPC .......................... 33/503, 556, 558, 559, 560
See application file for complete search history.

(56) References Cited

U.S. PATENT DOCUMENTS

| | | | | |
|---|---|---|---|---|
| 5,251,156 | A * | 10/1993 | Heier | G01B 11/005 |
| | | | | 33/503 |
| 5,825,666 | A | 10/1998 | Freifeld | |
| 7,665,219 | B2 * | 2/2010 | Styles | G01B 21/047 |
| | | | | 33/503 |
| 7,735,234 | B2 * | 6/2010 | Briggs | G01B 5/012 |
| | | | | 33/561 |
| 8,141,261 | B2 * | 3/2012 | Engel | G01B 5/012 |
| | | | | 33/503 |
| 10,458,772 | B2 * | 10/2019 | Cobb | G01B 21/047 |
| 2002/0111766 | A1 | 8/2002 | Sewell | |
| 2009/0241360 | A1 * | 10/2009 | Tait | G01B 21/042 |
| | | | | 33/502 |
| 2014/0171802 | A1 * | 6/2014 | Kuroiwa | A61B 8/4411 |
| | | | | 600/459 |
| 2016/0076867 | A1 * | 3/2016 | Ruck | G01B 21/047 |
| | | | | 33/503 |
| 2016/0102965 | A1 * | 4/2016 | York | G01B 21/04 |
| | | | | 250/231.1 |
| 2016/0364869 | A1 * | 12/2016 | Siercks | H04N 5/247 |
| 2019/0004092 | A1 * | 1/2019 | Hemmings | G01B 21/047 |
| 2020/0132452 | A1 * | 4/2020 | Rees | G01B 5/012 |

* cited by examiner

COORDINATE MEASURING MACHINE PROBE IDENTIFICATION APPARATUS AND METHOD

PRIORITY

This patent application claims priority from provisional U.S. Patent Application Ser. No. 62/566,644, filed Oct. 2, 2017 entitled, "PROBE IDENTIFICATION APPARATUS AND METHOD," and naming Gurpreet Singh, Milan Kocic, and Michael Mariani as inventors, the disclosure of which is incorporated herein, in its entirety, by reference.

FIELD OF THE INVENTION

Illustrative embodiments of the invention generally relate to coordinate measuring machines and, more particularly, various embodiments of the invention relate to identifying probes for use with coordinate measurement machines.

BACKGROUND OF THE INVENTION

Coordinate measuring machines (CMMs) are widely used for accurately measuring a wide variety of different types of work pieces/objects. For example, CMMs can measure critical dimensions of aircraft engine components, surgical tools, and gun barrels. Precise and accurate measurements help ensure that their underlying systems, such as an aircraft in the case of aircraft components, operate as specified.

CMMs often use one or more tactile or optical probes to measure an object. Proper identification of the correct probe can be critical to accurate measurement.

SUMMARY OF VARIOUS EMBODIMENTS

In accordance with one embodiment of the invention, a coordinate measuring machine system has a base configured to support a workpiece, a movable portion configured to move relative to the base, and a control system configured to control movement of the base and/or the movable portion. The system also has a set of probes that each are configured to be removably couplable with the movable measurement portion. Each of the set of probes is configured to be removably couplable with the movable measurement portion, and has a shaft with a distal end and a proximal end. The proximal end has a region for coupling with the movable measurement portion, while the distal end has a region configured to interact with the workpiece. Each of the probes also has visual identifying indicia on the shaft. The visual identifying indicia are encoded to identify at least one characteristic of the probe. Specifically, the indicia are encoded as base 3 or base 4 indicia.

In some embodiments, the identifying indicia include a plurality of stripes spaced along the shaft. Among other things, the plurality of stripes may include at least one stripe of a first color and a second stripe of a second color to contrast the first color. For example, the shaft may have a shaft color, and the second color may be the shaft color. As another example, a given stripe has the second color, and that second stripe is bounded and defined between first and third stripes of the first color.

The plurality of stripes may include a first stripe having a first thickness and a second stripe having a second thickness. The first and second thicknesses may be different. Moreover, as Base 3 or Base 4 indicia, the plurality of stripes includes five stripes or seven stripes.

The probe also may have a calibration stripe, also on the shaft, having a calibration thickness with a prescribed dimensional relationship to the plurality of stripes. The calibration stripe may extend from the distal end of the shaft to a prescribed point on the shaft.

In accordance with another embodiment, a probe for coupling with a movable portion of a coordinate measuring machine has a shaft with a distal end and a proximal end. The proximal end has a region for coupling with the movable portion of the coordinate measuring machine, while the distal end has a region configured to interact with a workpiece to be measured by the coordinate measuring machine. For example, the distal end may have a ruby ball or optics for optical measurement. The probe also has visual identifying indicia encoded to identify at least one characteristic of the probe. The indicia preferably are encoded as Base 3 or Base 4 indicia.

In accordance with other embodiments, a method of identifying a probe provides a probe having a shaft having a distal end and a proximal end and identifying indicia on the shaft identifying the probe. As in the above discussed embodiment, the indicia are Base 3 or Base 4 indicia. The method then causes a vision device to capture the indicia, and compare the captured indicia to an indicia key to identify the probe.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 4 schematically shows a CMM probe configured in accordance with a third embodiment.

FIG. 5 schematically shows a CMM probe configured in accordance with a fourth embodiment.

DESCRIPTION OF ILLUSTRATIVE EMBODIMENTS

In illustrative embodiments, a coordinate measuring machine probe has indicia identifying it on its exterior surface, which has little surface area. To that end, the indicia preferably includes one or more stripes of varying thicknesses. To minimize the varying thicknesses and limit the total number of stripes, the indicia may include stripes encoded using Base 3 or Base 4 number systems. Accordingly, vision systems may more easily discern the indicia to identify the probe. This functionality thus enables a wider variety of lower cost vision systems for accurately identifying the indicia. Details of illustrative embodiments are discussed below.

Figure 1A:
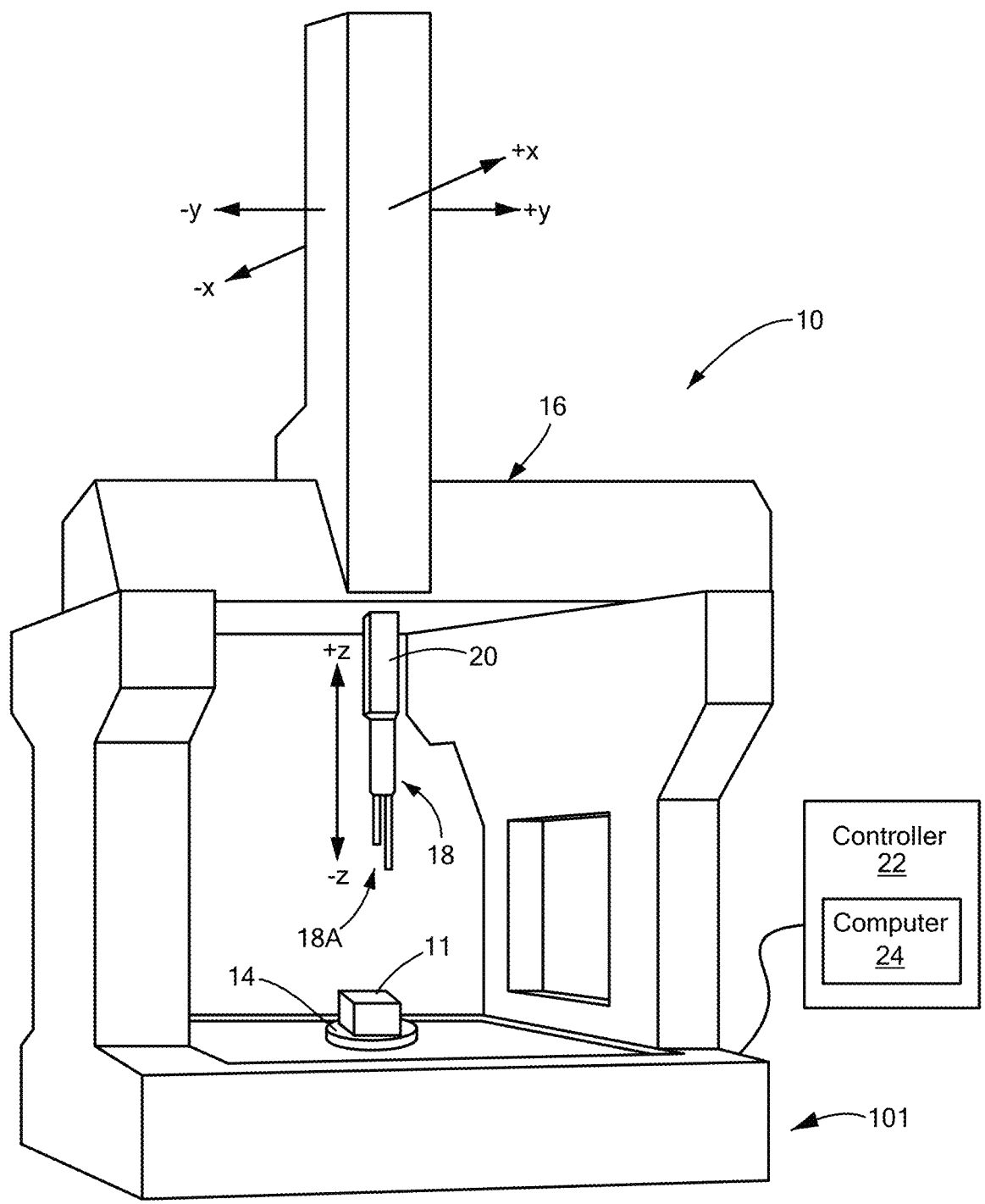
FIG. 1A schematically shows a coordinate measuring machine (CMM) that may be configured in accordance with illustrative embodiments of the invention.

FIG. 1A schematically shows of one type of coordinate measuring machine 10 (i.e., a CMM system, also referred to below as "CMM 10") that may be configured in accordance with illustrative embodiments. Indeed, this CMM 10 is but one of a number of different types of CMMs that may implement various embodiments. Accordingly, such a CMM is not intended to limit all embodiments.

As known by those in the art, the CMM 10, measures an object 11 (or work piece) on its bed/base (referred to as "base 101"), which may be formed from granite or other material. Generally, the base 101 defines an X-Y plane that typically is parallel to the plane of the floor supporting the CMM 10. In illustrative embodiments, the base 101 supports a rotary table 14 that controllably rotates the object 11 relative to the base 101 (discussed below).

To measure the object 11, the CMM 10 has movable features 16 (e.g., a carriage 103 and other parts) arranged to move a measuring device 18, such as a probe 18A (e.g., one or more contact or non-contact (e.g., optical) probes, identified as reference number 18A), coupled with a movable arm 20. Alternately, some embodiments move the base 101 with respect to a stationary measuring device 18. Either way, the movable features 16 of the CMM 10 manipulate the relative positions of the measuring device 18 and the object 11 to obtain the desired measurement. In either case, the movable features 16 (and its arm 20, discussed below) are movable relative to the base 101.

The CMM 10 has a control system 22 that controls and coordinates its movements and activities (shown schematically in FIG. 1A as "Controller 22"), which may be internal to the CMM 10, external to the CMM 10, or have both internal and external components. Among other things, the control system 22 preferably includes hardware, such as dedicated hardware systems and/or computer processor hardware. Among other things, the computer processor may include a microprocessor, such as a member of the Intel "Core i7" family of integrated circuit microprocessors available from Intel Corporation, or a digital signal processer, such as a member of the TMS320C66x family of digital signal processor integrated circuits from Texas Instruments Incorporated. The computer processor has on-board digital memory for storing data and/or computer code, including instructions for implementing some or all of the control system operations and methods. Alternatively, or in addition, the computer processor may be operably coupled to other digital memory, such as RAM or ROM, or a programmable memory circuit for storing such computer code and/or control data.

Alternately, or in addition, some embodiments couple the CMM 10 with an external computer system 24 ("host computer 24"). Although FIG. 1A shows the computer system 24 as part of the control system, those skilled in the art should understand that it may be separate from the control system 22. In a manner similar to the control system 22, the host computer 24 has a computer processor such as those described above, and computer memory in communication with the processor of the CMM 10. The memory is configured to hold non-transient computer instructions capable of being executed by its processor, and/or to store non-transient data, such as 1) scan path data used to guide the measuring device 18 during a measurement scan, and/or 2) data acquired as a result of the measurements of an object 11 on the base 101.

Among other things, the host computer system 24 may be implemented as one or both of a desktop computer, a tower computer, or a laptop computer, such as those available from Dell Inc., or even a tablet computer, such as the IPAD available from Apple Inc. The host computer 24 may be coupled to the CMM 10 via a hardwired connection, such as an Ethernet cable, or via a wireless link, such as a Bluetooth link or a WiFi link. As part of the control system 22, the host computer 24 may, for example, include software to control the CMM 10 during use or calibration, and/or may include software configured to process data acquired during a calibration process. In addition, the host computer 24 may include a user interface configured to allow a user to manually or automatically operate the CMM 10.

Because their relative positions typically are determined by the action of the movable features 16, the CMM 10 may be considered as having knowledge about the relative locations of the base 101, the rotary table 14, the object 11 on the rotary table, and the measuring device 18. More particularly, the control system 22 and/or computer system 24 may control and store information about the motion of the movable features 16. Alternately, or in addition, the movable features 16 of some embodiments include sensors that sense the locations of the base 101 and/or measuring device 18, and report that data to the control system 22 and/or the computer system 24. The information about the motion and position of the base 101 and/or measuring device 18 of the CMM 10 may be recorded in terms of a one dimensional, two-dimensional (e.g., X-Y; X-Z; Y-Z) or three-dimensional (X-Y-Z) coordinate system referenced to a point on the CMM 10.

The CMM 10 may have more than three degrees of freedom; i.e., more degrees of freedom in this example than in the X, Y, and Z directions. For example, the end of the arm 20 may include a wrist mechanism 60 (e.g., see FIG. 6, discussed below) that rotates the measuring device 18/18A, thus providing up to three more degrees of freedom.

Figure 1B:
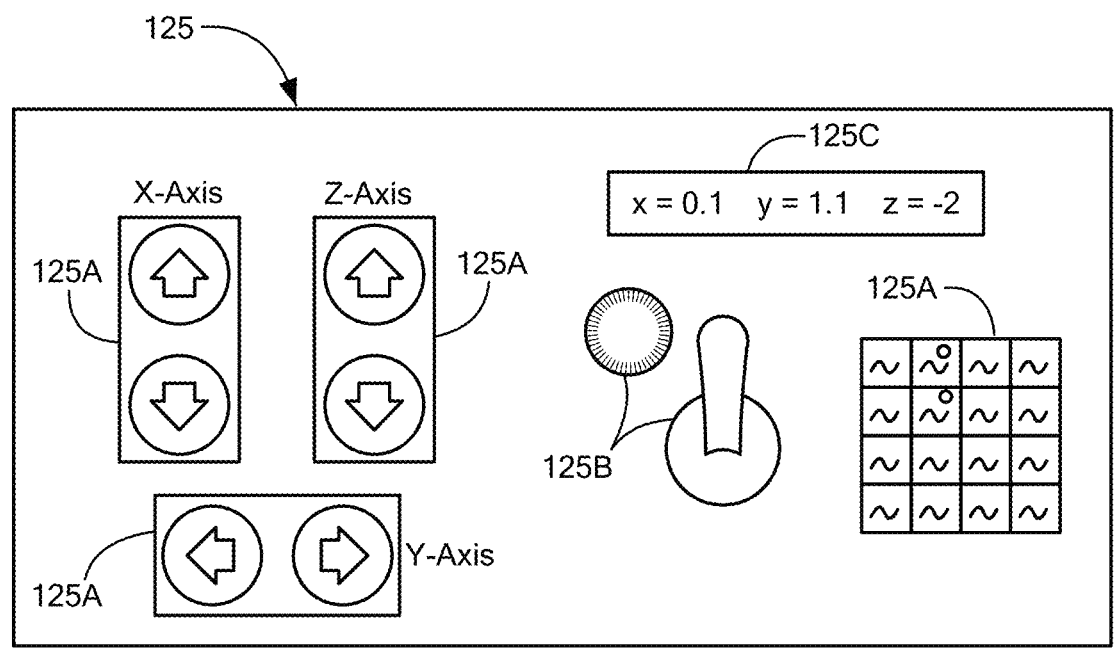
FIG. 1B schematically shows a user interface that may be used with the CMM of FIG. 1A.

Some CMMs 10 also include a manual user interface 125 as schematically illustrated in FIG. 1B. Among other things, the manual interface 125 may enable the user to change the position of the measuring device 18 or base 101/rotary table 14 (e.g., with respect to one another), and to record data relating to the position of the measuring device 18 or base 101/rotary table 14. To that end, the manual user interface 125 may have control buttons 125A and joysticks or knobs 125B that allow a user to manually operate the CMM 10. The interface 125 also may have a display window 125C (e.g., a liquid crystal display) for showing system positions, and programming certain functions and positions of the measuring device 18 or base 101. Of course, the manual interface 125 may have a number of other components and thus, the components 125A-125C shown in this drawing are for illustrative purposes only. Other embodiments may omit this manual interface 125. In illustrative embodiments, since the measuring process typically is automated, this interface 125 may not be used.

In a moving table CMM 10, for example, the measuring device 18 may also be movable via control buttons 125A. As such, the movable features 16 may respond to manual control, or be under control of an internal computer processor, to move the base 101 and/or the measuring device 18 (e.g., a mechanical probe or a laser probe in a mechanical CMM 10) relative to one another. Accordingly, this arrangement permits the object 11 being measured to be presented to the measuring device 18 from a variety of angles, and in a variety of positions.

FIGS. 2-6 schematically show various different probes 18A configured in accordance with illustrative embodiments of the invention. As noted above, these probes 18A may be tactile probes, optical probes, or other probes know in the CMM art. Those skilled in the art also may refer to probes as "tips" or "styli." For simplicity, however, this discussion refers to them as probes only.

Individual probes 18A often are members of a family of probes 18A having different sizes. For example, probes 18A of a family may have different shaft lengths and shaft thicknesses to measure a variety of different objects 11. They may be selected based on the type of CMM 10 to be used, and/or the object/workpiece 11 being measured. In either case, potentially due to their limited sizes and lack of surface area, probes in the prior art known to the inventors do not have size identification markings. Instead, a technician measures the probe, or it is positioned in a case or holder identifying its size. To ensure an accurately sized probe, the technician physically measures prior art probes with well calibrated calipers or similar device, which could be cumbersome, error prone, and time consuming. Moreover, prior art probes may not be efficiently usable in automated process that automatically selects probes for CMM processes. The inventors recognized these problems and, in response, developed a system that enables vision systems 72 (e.g., see FIG. 7, discussed below) to relatively easily identify a probe despite its limited surface area.

Figure 2:
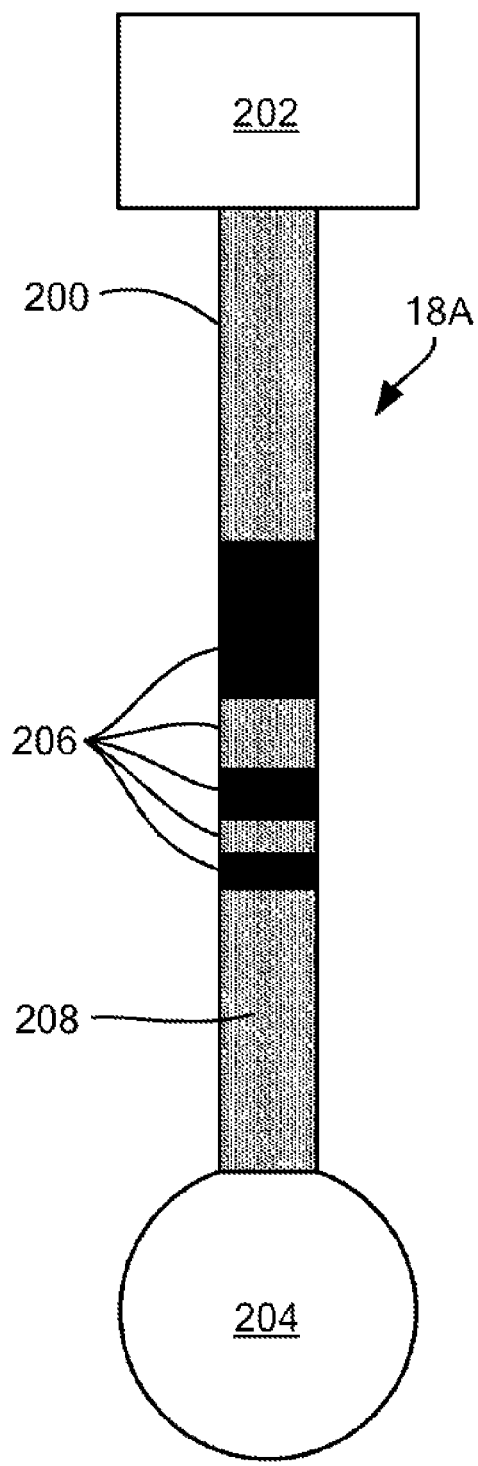
FIG. 2 schematically shows a CMM probe configured in accordance with a first embodiment.

To that end, FIG. 2 schematically shows a tactile probe 18A configured in accordance with illustrative embodiments of the invention. As with many other probes, this probe 18A has a cylindrical shaft 200, formed from metal or other rigid material, with a proximal end (i.e., the top of the figure of the CMM 10) and a distal end (i.e., the bottom of the figure). To couple with the movable arm of the CMM 10, the proximal end of the shaft 200 has integral coupling hub 202. In a corresponding manner, the distal end of the shaft 200 has a sphere 204 formed from a hard material, such as ruby material, for contacting the object 11 being measured.

In accordance with illustrative embodiments, the shaft 200 has identification indicia specially configured to efficiently and effectively identify the shaft 200; namely, the indicia provides encoded data that, once obtained, enables the user or logic to determine information about the probe 18A, such as its length and/or diameter. As additional examples, this information may encode data that enables the user or logic to obtain other information, such as the origin of the probe 18A, the manufacturer, the owner, or other information.

Illustrative embodiments produce the identification indicia in a manner that is more easily readable by vision systems 72. To that end, in illustrative embodiments, the identification indicia preferably is in a visual form that corresponds with Base 3 or Base 4 number systems. This visual identification indicia may be formed in any of a variety of manners, such as by additive (paint or deposited material) and/or subtractive processes (e.g., etching). In the example of FIG. 2, the probe 18A has five integral stripes 206 on the shaft 200 encoding a number in Base 3. Three of the stripes 206 in this embodiments are formed in an opaque color (e.g., black), while the two other stripes 206 are formed by the space between two opaque stripes 206. Accordingly, the stripes 206 formed by the space simply is the surface color of the shaft 200 (referred to below as having a "transparent" color). Other embodiments, however, may use stripes 206 of different opaque colors (e.g., black, blue, green, etc.), and/or may machine the stripes into the shaft 200.

Each stripe 206 forming the encoded value has a prescribed thickness (i.e., its length along the longitudinal axis of the shaft 200). This prescribed thickness, however, is one of three different thicknesses. For illustrative purposes, FIG. 2 highlights these three sizes from top to bottom of the opaque stripes 206. Specifically:

A thickest stripe 206 (value of 2);
A medium thickness stripe 206 (value of 1);
A thin stripe 206 (value of 0).

The identifying indicia of FIG. 2 therefore is considered to encode the Base 3 number 21100, which is equal to 198 in Base 10. Accordingly, the probe 18A of FIG. 2 has the identification indicia equal to 198. A technician or logic therefore can access a table or database identifying a plurality of different probes 18A, including the probe identified by number 198. The logic or technician then may know the size of the probe 18A using that table.

Alternatively, logic or a technician may need a specific probe 18A, such as probe 18A identified by number 198 of FIG. 2. The logic or technician then may locate the required probe 18A simply by scanning or viewing the identification indicia on a plurality of probes 18A. Those probes 18A may be in the vicinity of the CMM 10, or in an off-site storage location. Then, the probe 18A identified by number 198 may be obtained and then coupled with the CMM 10 for use in a measurement operation.

Whether identifying a probe 18A or looking for a probe 18A with specific identifying indicia, various embodiments either manually view the identifying indicia, or use vision systems 72 to scan the identifying indicia. Either way, the inventors recognized that use of higher base numbering systems can present difficulties with accuracy of either method—especially with lower resolution vision systems 72. Specifically, Base 3 numbering system only requires three different thicknesses for the various bands, and with five digits, enables up to 242 possible probe types. Higher base numbering systems may enable more possible probe types for the same number of stripes. Undesirably, however, higher base number systems require more stripe thicknesses. Using higher base numbering systems therefore can cause errors due to the limitations of various scanners and vision systems 72. Accordingly, these higher base numbering systems undesirably can reduce the signal to noise ratio of the vision systems 72, requiring higher quality (and often higher cost) optics.

Some embodiments measure the stripes 206 to determine the encoded data. Other embodiments, however, simply compare the thicknesses of the stripes 206 to determine the encoded identification information. This latter method may present some problems, however, when all the stripes 206 are the same size. To obviate that issue, illustrative embodiments add a calibration stripe 208 to the shaft 200. Specifically, this calibration stripe 208 has a known thickness against which all of the stripes 206 may be compared. For example, the calibration stripe 208 can be set to one unit, and the Base 3 system can have stripes 206 that are the same thickness as the calibration stripe 208, twice the calibration stripe thickness, or three times the calibration stripe thickness. The calibration stripe 208 thus acts as a built-in ruler against which to make simple measurements.

The calibration stripe 208 can be positioned at any of a variety of different locations along the shaft 200. One embodiment positions the calibration stripe 208 near the distal end of the shaft 200. In some embodiments, the calibration stripe 208 extends from the distal end of the shaft 200 to the first, distal-most opaque stripe 206. For example, in FIGS. 2-5, the calibration stripe 208 extends the distance from the distal tip of the shaft 200 to the beginning of the closest opaque stripe 206. As such, after measuring the calibration stripe 208, logic may use its length as input into a formula that provides precise calibration information (e.g., divide the length by 4 for the lowest thickness stripe 206).

In this example, the calibration stripe 208 is simply the native shaft color and larger than many of the stripes 206. Accordingly, like other stripes 206, the calibration stripe 208 in such an embodiment may be considered to be transparent—it has the color of the shaft 200. Some embodiments, however, may form the calibration stripe 208 from opaque material, as shown in FIG. 2. Other embodiments may position the calibration stripe 208 at a different location, such as at the proximal end of the shaft 200, or some point therebetween. As noted, this calibration stripe 208 may be opaque or transparent (i.e., the color of the opaque stripes and bounded by the opaque stripes on its top and bottom).

Figure 3:
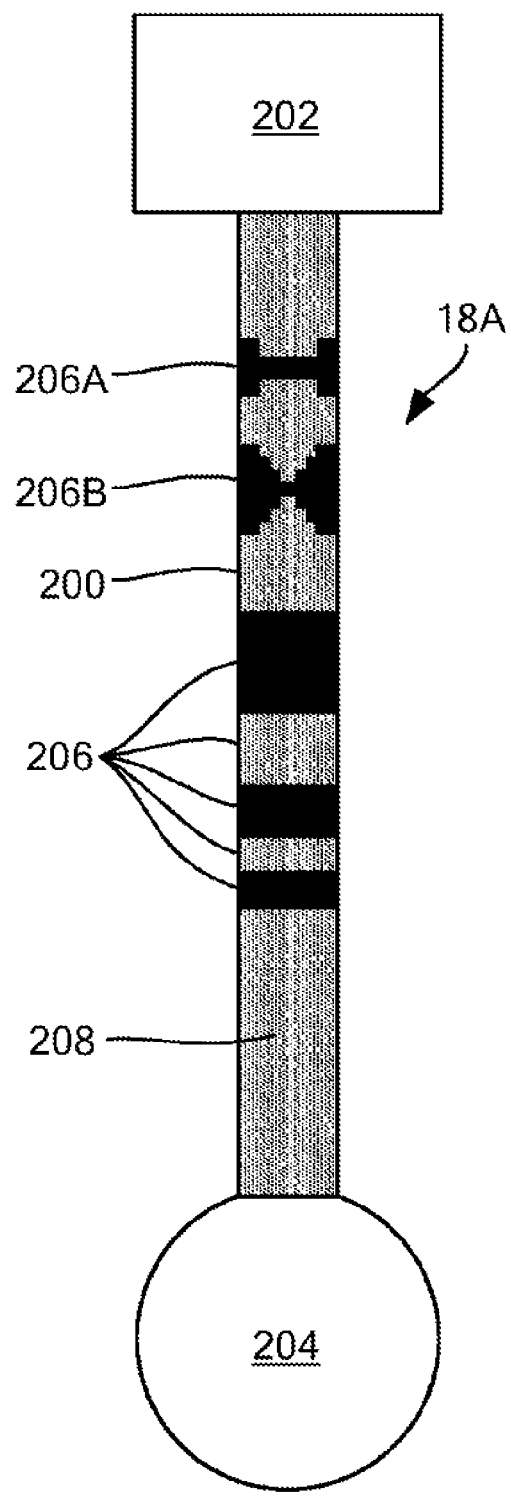
FIG. 3 schematically shows a CMM probe configured in accordance with a second embodiment.

Some embodiments, however, may form a calibration strip directly into the strips/indicia used to identify the number—thus integrating the calibration information directly into the stripe itself (i.e., it forms a portion of the stripe). For simplicity, FIG. 3 shows two different types of such self-calibrating stripes. It should be noted that these two different types of stripes 206/208, as well as the non-self-calibrating stripes 208 of FIG. 3, do not necessarily have all three different types of stripes. However, some embodiments may include two or more different types of indicia, such as self-calibrating stripes 206/208 and non-self-calibrating stripes 208, to enable use of different vision systems 72. For example, a probe 200 may have a first non-self calibrating set of indicia and two sets of self-calibrating indicia for identification by three different systems.

The two different self-calibrating stripes 206A and 206B of FIG. 3 are merely two examples of such stripes. As shown, both stripes have varying thicknesses with different stepped portions. In these examples, the thinnest stepped portions of the stripes 206A and 206B serve as the calibration portion and the thickest portion serves to identify the number in Base 3 (or Base 4, as discussed below). This pattern preferably is periodically repeated around the probe to the extent possible for maximum visualization by the vision systems 72.

Accordingly, for the stripe 206A, vision systems 72 may image the thin stepped portion as the calibration portion, and then recognize that the widest stepped portion is two times the width of the calibration portion. The widest portion thus identifies the number in Base 3 for that stripe. In a similar manner, for the stripe 206B, the widest stepped portion is four times the size of the calibration stripe. The vision system 72 therefore may use the widest stepped portion to identify the Base 3 number for that stripe.

The inventors recognized that Base 4 numbering systems also may provide satisfactory results, although with more possibility of error due to the additional stripe thickness requirement. FIG. 3 schematically shows the probe 18A of FIG. 2, but with a Base 4 numbering system. This example therefore shows four different stripe thicknesses. Using a Base 4 number system with five digits favorably enables up to 1023 possible probe types, which is more than four times the options of a similar Base 3 system. If using opaque stripes 206, then the Base 4 system of FIG. 3 may require only 4 digits to enable up to 255 possible types.

Indeed, the figures are not drawn to scale. These figures nevertheless show that the shaft 200 has very little surface area for printing identification indicia relating to the shaft 200. Even though they have only two thicknesses, a conventional bar code, for example, which is Base 2, would likely produce many stripes 206 that may have trouble fitting on smaller probes 18A. Base 3 and 4 numbering systems therefore are preferred. Despite that, other embodiments may apply to other numbering systems and other types of indicia. For example, the stripes 206 may encircle the shaft 200, or only extend part way around the shaft 200. Other embodiments may use different shapes (e.g., dashes), with the risk of vision systems 72 having difficulty acquiring their images.

Some embodiments may vary some other parameter of the identification indicia other than stripe thickness. For example, some embodiments may vary colors and maintain the stripe thickness uniform. Others may vary the shapes of the indicia in some other manner. Some embodiments, may encode directly within the stripes 206. For example, each stripe 206 may have a prescribed pattern encoded with certain data. This encoding scheme may be used separately from other bands 206, or in combination with other stripes 206.

It should be reiterated that discussion of tactile probes 18A is by example only. Other embodiments apply to other types of probes 18A. FIGS. 4 and 5 respectively show a first optical probe 18A using the Base 3 identification indicia, and a second optical probe 18A using the Base 4 identification indicia.

Figure 6:
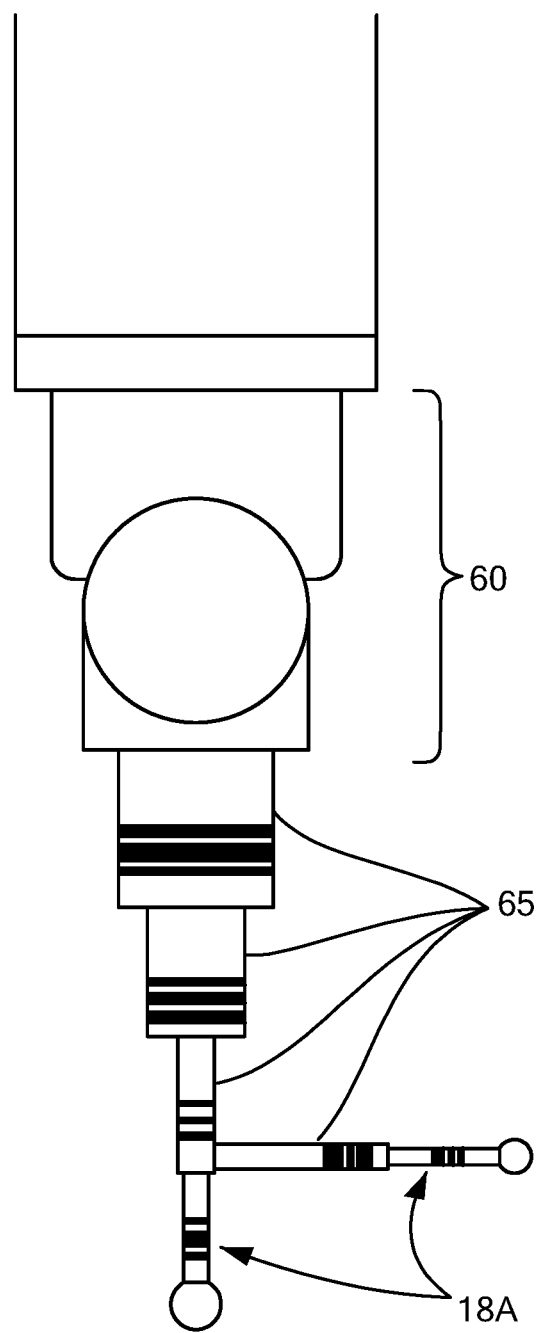
FIG. 6 schematically shows a CMM with multiple probes configured in accordance with illustrative embodiments.

FIG. 6 schematically shows a CMM with multiple probes/styli 18A configured in accordance with illustrative embodiments. In this example, the movable arm 20 (the –Z ram) has the prior noted wrist 60, which supports one or more extensions or adapters 65 that can support a plurality of probes 18A. Those skilled in the art can extend this example to a variety of different multi-probe configurations using these extensions 65.

Some embodiments extend beyond CMMs, such as the CMM 10 of FIGS. 1A and 1B. For example, some embodiments apply to additive printer machines, CNC machines, and other devices that use a probe 18A.

Figure 7:
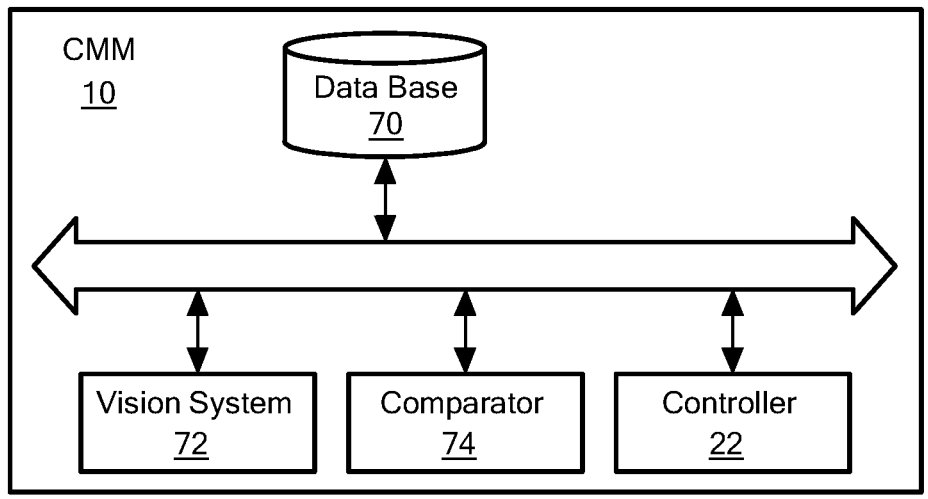
FIG. 7 schematically shows some portions of the CMM that may implement illustrative embodiments of the invention.

FIG. 7 schematically shows some portions of the CMM that may implement illustrative embodiments of the invention. Each of these components is operatively connected by any conventional interconnect mechanism. FIG. 7 simply shows a bus communicating each of the components. Those skilled in the art should understand that this generalized representation can be modified to include other conventional direct or indirect connections. Accordingly, discussion of a bus is not intended to limit various embodiments.

Indeed, it should be noted that FIG. 7 only schematically shows each of these components. Those skilled in the art should understand that each of these components can be implemented in a variety of conventional manners, such as by using hardware, software, or a combination of hardware and software, across one or more other functional components. For example, the comparator 74 may be implemented using a plurality of microprocessors executing firmware. As another example, the comparator 74 may be implemented using one or more application specific integrated circuits (i.e., "ASICs") and related software, or a combination of ASICs, discrete electronic components (e.g., transistors), and microprocessors. Accordingly, the representation of the comparator 74 and other components in a single box of FIG. 7 is for simplicity purposes only. In fact, in some embodiments, the comparator 74 of FIG. 7 is distributed across a plurality of different machines—not necessarily within the same housing or chassis.

It should be reiterated that the representation of FIG. 7 is a significantly simplified representation of an actual coordinate measuring machine. Those skilled in the art should understand that such a device has many other physical and functional components. Accordingly, this discussion is in no way intended to suggest that FIG. 7 represents all of the elements of a coordinate measuring machine.

As shown, the coordinate measuring machine has a vision system 72 that can image/capture the noted visual identification indicia on the probe(s), as well as the prior noted comparator 74 for comparing the imaged visual identification indicia against some known data, such as some indicia key in a database 70. The vision system 72 may a) be integrated into the coordinate measuring machine, b) be separate from the coordinate measuring machine, c) have portions that are both part of and separate from the coordinate measuring machine 10, and/or d) be removably couplable with the coordinate measuring machine 10. For example, the vision system 72 may be a hand-held device that is largely unconnected with the coordinate measuring machine 10. As a contrasting example, the vision system 72 may be part of a larger vision system 72 integrated into the coordinate measuring machine 10 and may be used for a plurality of additional functions (e.g., locating the workpiece). FIG. 7 also shows the prior noted controller 22 of FIG. 1, which performs a number of additional functions after receipt of the imaged visual identification indicia.

Figure 8:
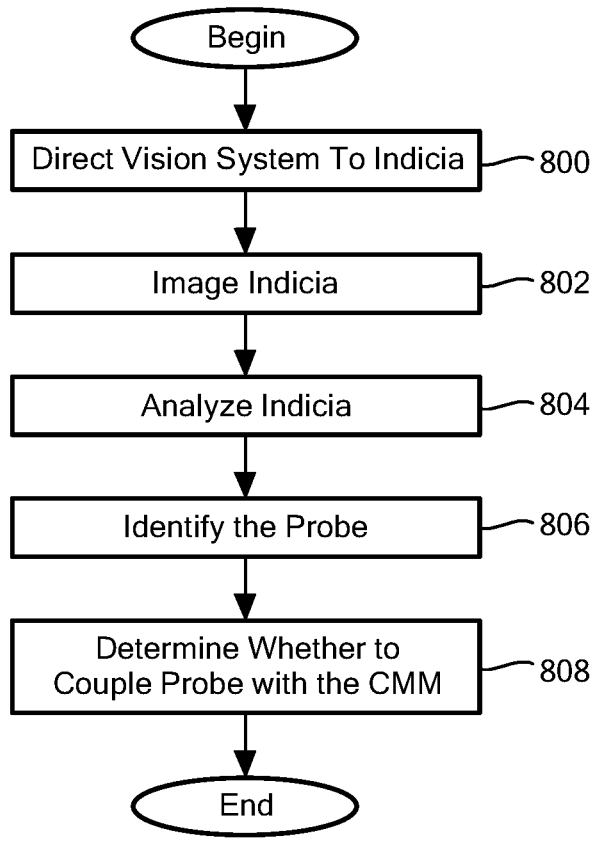
FIG. 8 shows a process of selecting a probe in accordance with illustrative embodiments of the invention.

FIG. 8 shows a process of selecting a probe 18A from a set of one or more probes in accordance with illustrative embodiments of the invention. It should be noted that this process is substantially simplified from a longer process that normally would be used to select a probe 18A. Accordingly, the process can have many steps. In addition, some of the steps may be performed in a different order than that shown, or at the same time. Those skilled in the art therefore can modify the process as appropriate. Moreover, as noted above and below, certain functional components noted are merely examples of certain structures that may be used. Those skilled in the art can select the appropriate functional components depending upon the application and other constraints. Accordingly, discussion of specific functional components is not intended to limit all embodiments.

The process of FIG. 8 begins at step 800, which directs the vision system 72 toward the indicia on a given probe 18A of a set of probes 18A. In illustrative embodiments, the CMM 10 is part of a system that is usable with a set of different probes 18A that each may be appropriate for specific workpieces. For example, a tactile probe 18A with a long, thin shaft may be more appropriate for use with workpiece having a long thin hole. Thus, a probe 18A with a wide and/or a short shaft likely is less desirable than the former noted probe 18A.

After directing the vision system 72 to the indicia, the process images the indicia. When using indicia encoded as Base 3 and/or Base 4 numbers, the vision system 72 can have lower sensitivity scanners than those required for imaging higher encoded indicia (e.g., Base 5 or Base 6). Accordingly, the signal to noise ratio favorably may remain within reasonable tolerances with lower cost, readily accessible image systems and still provide satisfactory results.

Step 804 then analyzes the indicia. First, in the embodiment using stripes 206 and 208, the controller 22 may use the calibration stripe 208 (whether it is integrated into the stripe(s) 206 or separate from the stripes 206) to compare against the various stripes 206 along the shaft to decode, calculate or determine the number encoded by the stripes 206. Step 806 then may call upon the controller 22 to compare the decoded indicia against some "indicia key"—prescribed numbers data stored in the database 70. For example, the database 70 may have a table with plurality of numbers that each are associated with, among other things, specific probe lengths, widths, and probe types (e.g., tactile or non-contact probes). As another example, the controller 22 may have logic that applies the decoded visual indicia into an algorithm or formula to match with one of the set of probes.

After identifying the probe in step 806, step 808 determines whether the probe 18A just identified should be coupled with the coordinate measuring machine 10. In other words, step 808 may use the controller 22 to determine if the identified probe 18A is appropriate or desired for use in measuring a specific workpiece. If not, then the process may repeat for another probe 18A in the set (if any are left). If the probe 18A is the appropriate or desired probe 18A, however, then the probe 18A may be coupled with the movable part of the coordinate measuring machine 10. To that end, the proximal end of the probe 18A may be removably coupled in a conventional manner to the movable arm 20 (e.g., using magnets and/or a mechanical coupling mechanism).

Accordingly, illustrative embodiments can properly mark/identify the limited real estate available on a CMM probe 18A, enabling automated and/or more effective use of the underlying coordinate measuring machines 10.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A coordinate measuring machine system comprising:
a base configured to support a workpiece;
a movable portion configured to move relative to the base;
a control system configured to control movement of the base and/or the movable portion; and
a set of probes that each are configured to be removably couplable with the movable measurement portion, each of the set of probes configured to be removably couplable with the movable measurement portion, each of the set of probes having a shaft with a distal end and a proximal end, the proximal end having a region for coupling with the movable measurement portion, the distal end having a region configured to interact with the workpiece, each of the probes also having visual identifying indicia on the shaft, the visual identifying indicia being encoded to identify at least one characteristic of the probe, the indicia being encoded as Base 3 or Base 4 indicia.

2. The coordinate measuring machine system of claim 1 wherein the identifying indicia includes a plurality of stripes spaced along the shaft.

3. The coordinate measuring machine system of claim 2 wherein the plurality of stripes includes at least one stripe of a first color and a second stripe of a second color to contrast the first color.

4. The coordinate measuring machine system of claim 3 wherein the shaft has a shaft color, the second color being the shaft color.

5. The coordinate measuring machine system of claim 2 wherein at least one of the plurality of stripes includes an integrated calibration portion.

6. The coordinate measuring machine system of claim 2 wherein the plurality of stripes includes a first stripe having a first thickness and a second stripe having a second thickness, the first and second thicknesses being different.

7. The coordinate measuring machine system of claim 2 wherein the plurality of stripes includes five stripes or seven stripes.

8. The coordinate measuring machine system of claim 2 further comprising a calibration stripe on the shaft, the calibration stripe having a calibration thickness with a prescribed dimensional relationship to the plurality of stripes.

9. A probe for coupling with a movable portion of a coordinate measuring machine, the probe comprising:
a shaft having a distal end and a proximal end, the proximal end having a region for coupling with the movable portion of the coordinate measuring machine, the distal end having a region configured to interact with a workpiece to be measured by the coordinate measuring machine; and
visual identifying indicia on the shaft, the visual identifying indicia being encoded to identify at least one characteristic of the probe, the indicia being encoded as Base 3 or Base 4 indicia.

10. The probe of claim 9 wherein the identifying indicia includes a plurality of stripes spaced along the shaft.

11. The probe of claim 10 wherein the plurality of stripes includes at least one stripe of a first color and a second stripe of a second color to contrast the first color.

12. The probe of claim 11 wherein the shaft has a shaft color, the second color being the shaft color.

13. The probe of claim 10 wherein at least one of the plurality of stripes includes an integrated calibration portion.

14. The probe of claim 10 wherein the plurality of stripes includes a first stripe having a first thickness and a second stripe having a second thickness, the first and second thicknesses being different.

15. The probe of claim 10 wherein the plurality of stripes includes five stripes or seven stripes.

16. The probe of claim 10 further comprising a calibration stripe on the shaft, the calibration stripe having a calibration thickness with a prescribed dimensional relationship to the plurality of stripes.

17. The probe of claim 16 wherein the calibration stripe extends from the distal end of the shaft to a prescribed point on the shaft.

18. A method of identifying a probe for use on a coordinate measuring machine, the method comprising:
providing a CMM probe for use with the coordinate measuring machine, the CMM probe having a shaft with a distal end and a proximal end, the shaft having visual identifying indicia identifying a characteristic of the probe, the identifying indicia being Base 3 or Base 4 indicia;
directing a vision device toward the CMM probe;
imaging the indicia using the vision device; and
using the imaged indicia to identify the characteristic of the probe.

19. The method of claim 18 wherein identifying comprises identifying the length of the probe, the thickness of the probe, or both the length and thickness of the probe.

20. The method of claim 18 wherein the vision device comprises a vision system that is part of the coordinate measuring machine.

21. The method of claim 18 further wherein the coordinate measuring machine comprises a movable portion, the CMM probe being uncoupled with the movable portion of the coordinate measuring machine when imaging the indicia, the coordinate measuring machine requiring a specific probe with a specific characteristic, the method further comprising:
determining whether the identified characteristic complies with the specific characteristic; and
coupling the CMM probe to the movable portion of the coordinate measuring machine after the identified characteristic is determined to comply with the specific characteristic.

22. The method of claim 18 wherein using comprises comparing the imaged indicia to an indicia key to identify the characteristic of the probe.

23. The method of claim 18 wherein the probe has a calibration stripe on the shaft, the method comprising comparing the captured indicia against the calibration stripe.

24. The method of claim 23 wherein the identifying indicia includes a plurality of stripes spaced along the shaft, the calibration stripe being integral with one of the plurality of stripes.

25. The method of claim 18 further comprising accessing a database to compare the captured indicia to a plurality of indicia keys, the database including a table of indicia keys.

26. The method of claim 18 wherein the identifying indicia includes a plurality of stripes spaced along the shaft.

27. The method of claim 26 wherein the plurality of stripes includes at least one stripe of a first color and a second stripe of a second color to contrast the first color.

28. The method of claim 27 wherein the shaft has a shaft color, the second color being the shaft color.

29. The method of claim 26 wherein the plurality of stripes includes a first stripe having a first thickness and a second stripe having a second thickness, the first and second thicknesses being different.

* * * * *